United States Patent [19]
Allen, Jr. et al.

[11] 4,039,251
[45] Aug. 2, 1977

[54] TAPERED CRYSTAL MODULATOR FOR LASERS

[75] Inventors: Louis B. Allen, Jr., Florissant; James R. Teague, St. Charles, both of Mo.

[73] Assignee: The United States of America as represented by the Secretary of the Air Force, Washington, D.C.

[21] Appl. No.: 678,517

[22] Filed: Apr. 19, 1976

[51] Int. Cl.² .................................................. G02F 1/28
[52] U.S. Cl. ............................. 350/157; 331/94.5 M; 332/7.51; 350/160 R
[58] Field of Search .......................... 350/157, 160 R; 331/94.5 M, 94.5 Q; 250/199

[56] References Cited

U.S. PATENT DOCUMENTS

| 3,429,636 | 2/1969 | Wentz | 350/160 R |
| 3,460,885 | 8/1969 | Wentz | 350/160 R |
| 3,529,885 | 9/1970 | Ammann | 350/160 R |

*Primary Examiner*—William L. Sikes
*Attorney, Agent, or Firm*—Joseph E. Rusz; George Fine

[57] ABSTRACT

A tapered crystal for use in a laser modulator in a communication system reduces switching voltage and driving power requirements. Alternately, the crystals are tapered for reduced crystal capacitance, thus decreasing the modulator rise time.

4 Claims, 4 Drawing Figures

FIG. 3a
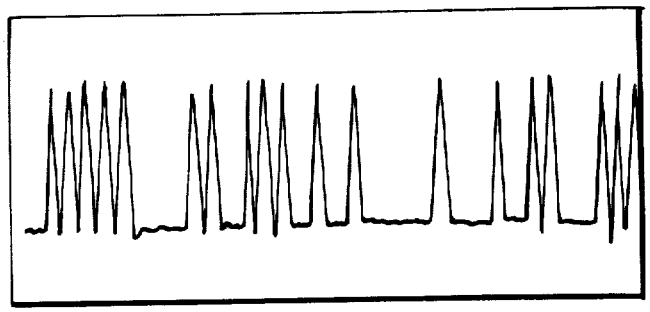
P₁ POLARIZATION
WORST CASE DYNAMIC EXTINCTION
RATIO ≥ 22.4:1
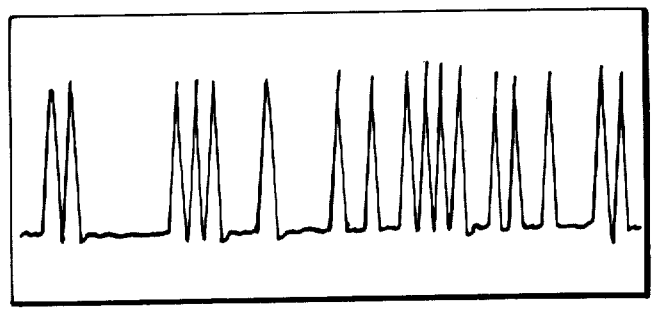
P₂ POLARIZATION
WORST CASE DYNAMIC EXTINCTION
RATIO ≥ 23.7:1
FIG. 3b

TAPERED CRYSTAL MODULATOR FOR LASERS

STATEMENT OF GOVERNMENT INTEREST

The invention described herein may be manufactured and used by or for the Government for governmental purposes without the payment of any royalty thereon.

BACKGROUND OF THE INVENTION

One of the prior art electro-optical light modulating systems utilizes two identical electro-optic crystals positioned with the X-axis of one crystal and the Y-axis of the other crystal parallel and orthogonal to the light path, a modulating voltage being applied along the Z-axis of the two crystals to control the polarization of the transmitted light. Each of the crystals is a rectangular parallelopiped with square end faces.

In the prior art electro-optical modulator there is included two birefringent crystals having substantially the same angles to the optical axis which is determined by the coaxial alignment of one of each of the axes of the respective crystals. The modulation voltage is applied across a crystal with the electric vector parallel to the Z-axis of the crystal. The crystals are elongated and have a square cross section or a rectangular cross section.

It is noted that the usual crystal configuration is a rectangular parallelepiped. The optical wavelength, index of refraction, and crystal length determine the minimum crystal aperture which may be used without aperture effects. There exists an optimized beam periphery in a modulator configuration. This occurs only when the beam is confocally focused to a point between the crystals. The beam diameter, W, in this configuration is usually about one-third the crystal aperature size and the waist, $W_o$, is $\sqrt{2}$ smaller than W. No significant reduction of either the input or output crystal aperture is possible without impairing the modulator transmission. The maximum crystal capacitance which can be tolerated for adequate rise time sets the maximum useable crystal length. The special case of lithium tantalate being used for 0.53 mm operating at 1 Gbps limits the crystal length to about 10 mm. The minimum crystal aperture which can be used with two such crystals of this length is 0.22 mm resulting in a switching voltage of 22 volts for 150° C operation. Modulator driver capability for this application at the present time is not adequate for best performance at switching voltages above 20 volts.

Using rectangular parallelopiped crystals, there is no way of reducing the switching voltage for the above cases using two crystals without increasing the crystal capacitance for increasing the length and, hence, increasing the rise time too much for adequate 1 Gbps operation. The present invention by tapering the crystals provides a reduced switching voltage, or reduced capacitance, without reducing the aperture. The same optical safety factor is maintained in the entire crystal length for minimizing the drive voltage and power below that obtainable with straight cross section crystals.

The chief advantage of the tapered crystal modulator for this application is the capability of operating the modulator at reduced switching voltage and driver power. In addition, it is possible to taper the crystals for reduced crystal capacitance, thus decreasing the modulator rise time for improved response at a higher data rate.

It is emphasized that the present invention is an improvement in the usual crystal configuration for an electro-optical modulator for lasers wherein the configuration includes the aforementioned pair of crystals, each being a straight cross section crystal.

The chief advantage of the tapered crystal modulator for this application is the capability of operating the modulator at reduced switching voltage and driver power. In addition, it is possible to taper the crystals for reduced crystal capacitance, thus decreasing the modulator rise time for improved response at a higher data rate.

It is emphasized that the present invention is an improvement in the usual crystal configuration for an electro-optical modulator for lasers wherein the configuration includes the aforementioned pair of crystals, each being a straight cross section crystal.

SUMMARY OF THE INVENTION

A tapered crystal modulator for laser applications is provided. The conventional pair of crystals is utilized in the modulator, however each of the crystals is tapered to permit a reduction in switching voltage and driver power. Alternately, the crystals are tapered for reduced capacitance, thus decreasing the modulator rise time.

DESCRIPTION OF DRAWINGS

FIGS. 3a and 3b show the modulator output for each of the two orthogonal outputs.

DETAILED DESCRIPTION OF THE PREFERRED EMBODIMENT

Figure 1:
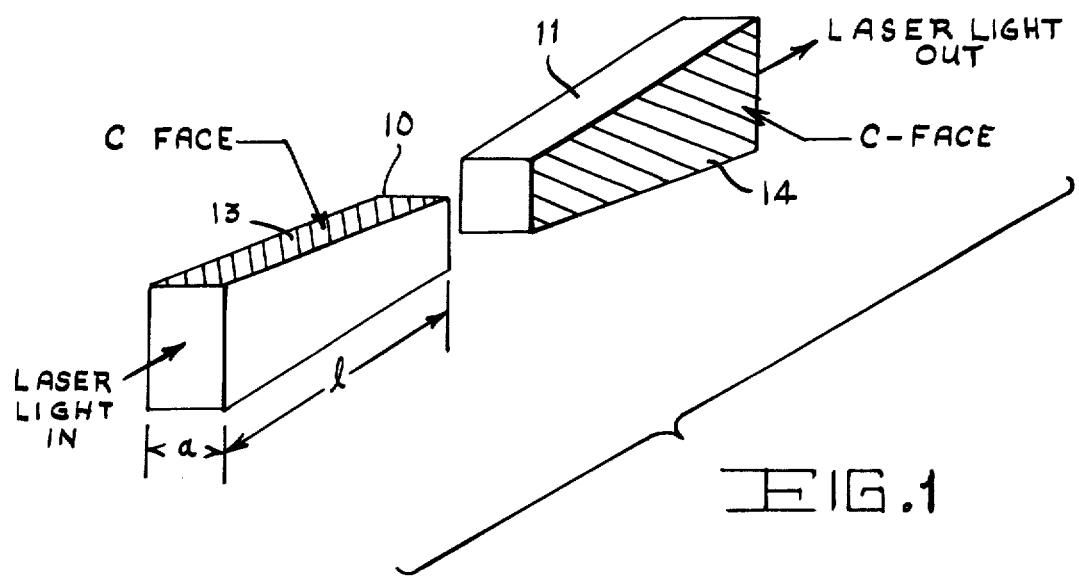
FIG. 1 shows one view of the crystal configuration for the specific modulator described.

Now referring to FIG. 1, there is shown a pair of tapered crystals for use on a modulator for laser applications. The conventional pair of crystals utilized in modulators for lasers is such as shown and described in U.S. Pat. No. 3,429,636 issued Feb. 25, 1969. The electrical interconnections of the crystal configuration therein may be the same as the invention. However, the present invention provides a substantial improvement in the modulator performance by tapering crystals 10 and 11. In the example cited crystals 10 and 11 use the Pockels effect in lithium tantalate to provide polarization modulation of input laser light 12. The optical wavelength, index of refraction, and crystal length, $l$ determine the minimum crystal aperture, $a$, which may be used without aperture effects. The orientation of the C faces 13 and 14 of crystals 10 and 11, respectively, is as indicated.

Figure 2:
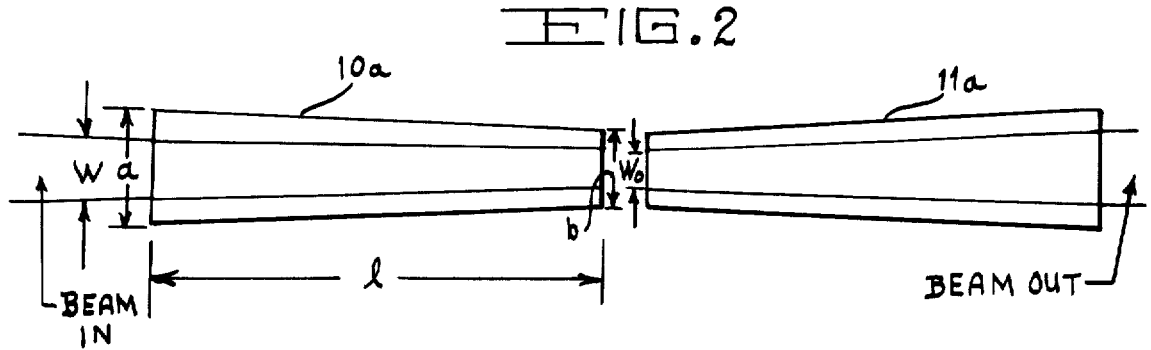
FIG. 2 shows a second view of the tapered crystal modulator configuration.

Now referring in detail to FIG. 2, there is shown the optimized optical beam periphery in a modulator configuration. The beam diameter, W, is usually about ⅓ the size of crystal aperture, $a$. The beam waist, $W_o$, is $\sqrt{2}$ smaller than W. No significant reduction of crystal aperture is possible without impairing the modulator transmission.

The optimized size configuration for 0.53 μm operation using lithium tantalate crystals at 150° C at 1 Gbps is: $W_o \simeq 50$ μm, $W \simeq 75$ μm, $l = 10$ mm, $a = 0.22$ mm, and $b = 0.15$ mm for a switching voltage at 18.5 volts as compared to 220 volts for the corresponding straight crystal modulator. One of the crystal modulators had the b-faces of the crystal ground for reduced capacitance. The crystal RC time constant was reduced for improved modulator optical rise time. The improved crystal rise time capability was somewhat masked by inaccuracies in the modulator driver output timing inaccuracies. No reduction or extinction ratio capability improved was observed in this modulator as compared to a straight crystal modulator of equal aperture.

Another tapered crystal modulator configuration had the c-faces of the crystal ground for reduced switching voltage. The crystal size used was 0.25 mm square on one end and 0.155 × 0.25 mm on the other end resulting in a switching voltage of 19.8 volts. Dynamic switching tests performed with a 1 Gpps 0.53 μm mode-locked Nd:YAG laser output showed the dynamic switching performance of the modulator incorporating the tapered crystals was significantly better than that of the corresponding straight crystal modulator. FIGS. 3a and 3b show the modulator output for each of the two orthogonal outputs obtained from the modulator. The data in FIGS. 3a and 3b show the extinction ratio obtained when each polarization was optimized separately. Worst case dynamic extinction ratios of ≃22.4:1 and ≃23.7:1 were obtained as compared to ≃17:1 for the corresponding straight crystal modulator.

What is claimed is:

1. For use in a modulator for laser applications a crystal configuration comprising first and second tapered crystals having the same index of refraction arranged in light-transmitting relationship with the respective optic axes of said crystals being effectively optically perpendicular to each other and to the optical axis determined by the coaxial alignment of one of each of the principal axes of said crystals, said crystals having the same length along said optical axis, each of said first and second tapered crystals having first and second ends, said first ends having a substantially larger cross section than said second ends, a laser beam enters said first ends of said first tapered crystal and exits said first ends of said second tapered crystal.

2. For use in a modulator for laser applications a crystal configuration as described in claim 1 wherein said first and second tapered crystals consist of lithium tantalate.

3. For use in a modulator for laser applications a crystal configuration as described in claim 2 wherein said first ends are 0.22 mm square and said second ends are 0.15 mm square for 0.53 μm operation.

4. For use in a modulator for laser applications a crystal configuration as described in claim 2 wherein said first ends are 0.25 mm square and said second ends are 0.15 mm by 0.25 mm.

* * * * *